(12) United States Patent
Jang et al.

(10) Patent No.: US 12,175,665 B2
(45) Date of Patent: Dec. 24, 2024

(54) COMPUTER SYSTEM FOR TRABECULAR CONNECTIVITY RECOVERY OF SKELETAL IMAGES RECONSTRUCTED BY ARTIFICIAL NEURAL NETWORK THROUGH NODE-LINK GRAPH-BASED BONE MICROSTRUCTURE REPRESENTATION, AND METHOD THEREOF

(71) Applicant: Korea Advanced Institute Of Science And Technology, Daejeon (KR)

(72) Inventors: InGwun Jang, Daejeon (KR); HyukJin Koh, Daejeon (KR); BongJu Chun, Daejeon (KR)

(73) Assignee: Korea Advanced Institute Of Science And Technology, Daejeon (KR)

( * ) Notice: Subject to any disclaimer, the term of this patent is extended or adjusted under 35 U.S.C. 154(b) by 485 days.

(21) Appl. No.: 17/573,762

(22) Filed: Jan. 12, 2022

(65) Prior Publication Data
US 2023/0122282 A1  Apr. 20, 2023

(30) Foreign Application Priority Data
Oct. 15, 2021 (KR) .................. 10-2021-0137093

(51) Int. Cl.
*G06T 7/00* (2017.01)
*G06N 3/02* (2006.01)
(Continued)

(52) U.S. Cl.
CPC .............. *G06T 7/0012* (2013.01); *G06N 3/02* (2013.01); *G06T 7/11* (2017.01); *G06T 7/181* (2017.01);
(Continued)

(58) Field of Classification Search
CPC ......... G06T 7/0012; G06T 7/181; G06T 7/11; G06V 10/457; G06N 3/02
See application file for complete search history.

(56) References Cited

U.S. PATENT DOCUMENTS 6,775,401 B2 * 8/2004 Hwang ................. G06T 7/0012
382/131
6,975,894 B2 * 12/2005 Wehrli .................... A61B 5/417
382/128
(Continued)

FOREIGN PATENT DOCUMENTS

KR 10-2016-0068086 A 6/2016
KR 10-1979906 B1 5/2019
KR 10-2223475 B1 3/2021

OTHER PUBLICATIONS

Wang, X. et al., "Rod-Like Trabeculae Extraction for Cancellous Bone Microstructure using Topological Analysis," Ninth International Conference on Computer Aided Design and Computer Graphics, pp. 173-180, Dec. 7, 2005.
(Continued)

*Primary Examiner* — David Bilodeau
(74) *Attorney, Agent, or Firm* — Nixon Peabody LLP

(57) ABSTRACT

Various embodiments relate to a computer apparatus for the bone microstructure connectivity recovery of a skeletal image reconstructed through an artificial neural network using the representations of a node-link graph-based bone microstructure and a method thereof. The computer apparatus and the method may be configured to represent a node-link graph from a bone microstructure of an input skeletal image, reinforce a connectivity of the bone microstructure in the node-link graph, and change the node-link graph into a skeletal image.

14 Claims, 7 Drawing Sheets

(51) Int. Cl.
*G06T 7/11* (2017.01)
*G06T 7/181* (2017.01)
*G06V 10/44* (2022.01)

(52) U.S. Cl.
CPC .. *G06V 10/457* (2022.01); *G06T 2207/10056* (2013.01); *G06T 2207/20084* (2013.01); *G06T 2207/30008* (2013.01)

(56) References Cited

U.S. PATENT DOCUMENTS

| | | | | |
|---|---|---|---|---|
| 9,443,351 | B2 | 9/2016 | Jang | |
| 11,308,623 | B2* | 4/2022 | Yuille | G06T 7/0012 |
| 2002/0025063 | A1* | 2/2002 | Jiang | G06T 7/0012 |
| | | | | 382/156 |
| 2011/0036360 | A1* | 2/2011 | Lang | A61B 6/4423 |
| | | | | 128/898 |
| 2016/0163101 | A1* | 6/2016 | Jang | A61B 5/4509 |
| | | | | 382/131 |
| 2018/0018766 | A1* | 1/2018 | Jang | A61B 5/055 |
| 2019/0183410 | A1* | 6/2019 | Rajapakse | A61B 5/4504 |
| 2023/0105966 | A1* | 4/2023 | Frazer | G06T 7/0012 |
| | | | | 382/131 |

OTHER PUBLICATIONS

Chun, B.-J. et al., "Patchwise bone microstructure reconstruction," The 2021 World Congress on Advances in Structural Engineering and Mechanics (ASEM21), Aug. 23-26, 2021.

Ishikawa, M. et al., "Automatic quantification of morphological features for hepatic trabeculae analysis in stained liver specimens," Journal of Medical Imaging, 3(2): p. 027502, Apr.-Jun. 2016.

Extended European Search Report in European Patent Application No. EP 22151224.7, mailed Jul. 15, 2022 (9 pages).

Koh, H. J. & Jang, G. W., "Node-Link Graph-Based Postprocessing Method of Avoiding an Artificial Structural Discontinuity of Bone Microstructure Reconstructed by the Deep Neural Network," Proceedings of the 2021 Spring Conference in CAE and Applied Mechanics of the Korean Society of Mechanical Engineers, Aug. 2021, pp. 196-197. (6 pages w/English translation).

Mondal, A. et al., "Network models for characterization of trabecular bone," Phys. Rev. E 99, Apr. 24, 2006, Jun. 26, 2019 (15 pages).

* cited by examiner

Original skeletal image

Node-link graph

COMPUTER SYSTEM FOR TRABECULAR CONNECTIVITY RECOVERY OF SKELETAL IMAGES RECONSTRUCTED BY ARTIFICIAL NEURAL NETWORK THROUGH NODE-LINK GRAPH-BASED BONE MICROSTRUCTURE REPRESENTATION, AND METHOD THEREOF

CROSS-REFERENCES TO RELATED APPLICATIONS

This application is based on and claims priority under 35 U.S.C. 119 to Korean Patent Application No. 10-2021-0137093, filed on Oct. 15, 2021 in the Korean intellectual property office, the disclosures of which are herein incorporated by reference in their entireties.

TECHNICAL FIELD

Various embodiments relate to a computer apparatus for the bone microstructure connectivity recovery of a skeletal image reconstructed through an artificial neural network using the representations of a node-link graph-based bone microstructure and a method thereof.

BACKGROUND OF THE DISCLOSURE

Only a few patients are aware of osteoporosis, that is, a representative degenerative condition, although he or she is attacked with osteoporosis despite a high prevalence rate without special observable symptoms. Only 27.7% of elderly female patients and 6.6% of elderly male patients in their 70s or older are aware of their osteoporosis. In general, timely and effective medical measures are difficult because patients aware of their osteoporosis after the occurrence of a bone fracture attributable to an external impact, etc. Furthermore, a bone fracture attributable to osteoporosis causes a reduction in quality of life along with serious impairments for a person. After osteoporosis fracture experiences, 61% of patients who were capable of normal activities and 31% of patients who were capable of outside activities lost their activabilities. Furthermore, it is reported that when a hip joint fracture occurs, a death rate within 30 days reaches about a level of 10% and a death rate within one year reaches a level of about 20%. After the Korean society enters an aging society, the number of osteoporosis patients continued to increase and exceeded one million in 2019. According to [Osteoporosis and osteoporosis fracture fact sheet 2019] issued by Korean Society of Bone Metabolism in 2019, an osteoporosis prevalence rate of people over the age of 50 is very high, that is, 37.3% in female and 7.5% in male. An osteopenia patient, that is, a pre-stage of osteoporosis, is 48.9% in female and 46.8% in male. Around the year of 2025 when the Korean society enters a super-aged society, there is a good possibility that osteoporosis will emerge as a core problem of the society. According to research so far, bone strength damaged due to osteoporosis cannot be recovered into an original level. This results from an irreciprocal characteristic in which the connectivity of a lost bone microstructure cannot be recovered through a bone remodeling process. That is, it is very important to prevent a loss of a bone microstructure attributable to osteoporosis. Accordingly, early diagnosis of osteoporosis has a clinically important meaning.

Osteoporosis is defined as a "state in which there is a good possibility that a bone fracture will occur due to reduced bone strength attributable to a reduction in bone mass and the quality deterioration of a bone microstructure." In this case, the bone strength means a force that a bone stands against a fracture, and is determined by "bone mass", that is, a total amount of bones, and a "bony tissue" such as a bone microstructure. Current osteoporosis diagnosis is performed through several types of radiation imaging equipment capable of measuring bone mineral density (BMD). Representative imaging equipment includes dual energy X-ray absorptiometry (DXA), quantitative computed photographing (QCT), etc. Such imaging equipment can measure "bone mass" information based on an X-ray decrement, but cannot obtain "bony tissue" information, such as bone microstructure, due to low resolution of a 600 μm level. That is, if two patients who have different bony tissues have the same bone mass, the two patients experience osteoporosis diagnosis having the same level although they have different bone strength. Accordingly, there is a possibility of osteoporosis-related miss diagnosis and/or over-diagnosis. Such a problem continues to be clinically reported. Accordingly, it is necessary to develop a new osteoporosis diagnosis method based on quantitative bone strength evaluation.

In bone strength evaluation, a bone microstructure is an element having a great influence. The prediction of bone strength through a simple BMD measuring method shows the accuracy of about 70%, but bone strength can be evaluated with the accuracy of 94% when even a three-dimensional bone microstructure is considered through the simple BMD measuring method. Furthermore, clinic research in which osteoporosis can be more accurately diagnosed when both BMD measurement and bone microstructure analysis are performed was released. That is, for reliable osteoporosis diagnosis, bone microstructure analysis is essential, but it is currently impossible to obtain a high-resolution medical image having 50 μm grade resolution capable of bone microstructure representations due to great radiation exposure, a low signal to noise ratio, a long photographing time, etc.

The existing medical imaging equipments greatly contributes to disease diagnosis and treatment in the clinic by quantitatively measuring and imaging information within a living body, but has several problems, such as a high radiation quantity, a low signal to noise ratio, a long photographing time, and the restriction of a photographing portion, in obtaini8 ng a high resolution skeletal image. For resolution improvements of radiation medical imaging equipment, various radiation detectors, new photographing methods, and a technology, such as photographing data interpolation, have been suggested. However, as securing image resolution through hardware improvements is encountered, a technology for improving resolution by post-processing image information obtained through medical imaging equipment is actively researched. A corresponding image high resolution technology is basically divided into an artificial neural network-based technology and a phase optimization design-based technology. Examples in which the artificial neural network-based image high resolution technology was applied to photographed images of several soft tissues, such as the brain, are frequently reported. However, in the case of high resolution of a skeletal image of a hard tissue, there is a difficulty in constructing a training database due to a difficulty in securing a high resolution skeletal image. Furthermore, high resolution magnification is now limited to a maximum of four times. Furthermore, since it is very difficult to successfully train an artificial neural network due to a bone microstructure having a complicated shape, an example in which the artificial neural network-based technology has been successfully applied to a skeletal medical image has not yet been reported. In the phase optimization design-based image high resolution technology, a bone microstructure having the greatest strength is searched for through the re-distribution of BMD under a given bone mass limiting condition based on Wolff's law that "bone remodeling is a process of changing a bone microstructure so that a bone can most efficiently stand against an external load with minimum mass." The phase optimization design-based technology shows high high-resolution magnification (about 10 times) and accurate bone strength evaluation accuracy, but has limits in clinic applications because excessive calculation is required due to repetitive finite element analysis.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Various embodiments propose a node-link graph-based bone microstructure post-processing technology conceptually different from the existing image high-resolution technology.

Various embodiments provide a computer apparatus for the bone microstructure connectivity recovery of a skeletal image reconstructed through an artificial neural network using the representations of a node-link graph-based bone microstructure and a method thereof.

A method of a computer apparatus according to various embodiments may include representing a node-link graph from a bone microstructure of an input skeletal image, reinforcing a connectivity of the bone microstructure in the node-link graph, and changing the node-link graph into a skeletal image.

A computer apparatus according to various embodiments a memory and a processor connected to the memory and configured to execute at least one instruction stored in the memory. The processor is configured to represent a node-link graph from a bone microstructure of an input skeletal image, reinforce a connectivity of the bone microstructure in the node-link graph, and change the node-link graph into a skeletal image.

A non-transitory computer-readable recording medium according to various embodiments may have, recorded thereon, one or more programs for executing, in a computer apparatus, a method including representing a node-link graph from a bone microstructure of an input skeletal image, reinforcing a connectivity of the bone microstructure in the node-link graph, and changing the node-link graph into a skeletal image.

According to various embodiments, a skeletal image successfully reconstructed through an artificial neural network can be obtained. Specifically, according to various embodiments, the occurrence of a discontinuous structure can be minimized and a skeletal image into which a structural characteristic of a bone microstructure has been incorporated can be obtained by applying the node-link graph-based bone microstructure post-processing technology. Accordingly, bone strength can be evaluated with high accuracy based on a skeletal image reconstructed according to various embodiments.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Hereinafter, various embodiments of this document are described with reference to the accompanying drawings.

Figure 1:
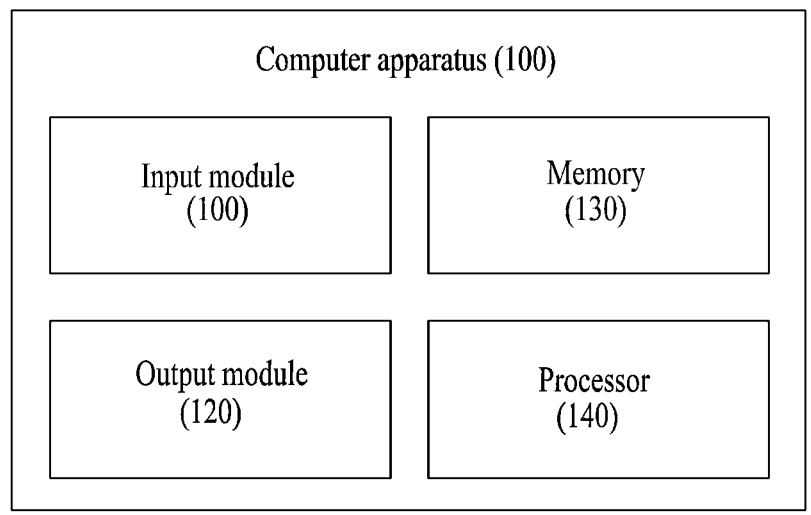
FIG. 1 is a diagram illustrating an internal construction of a computer apparatus according to various embodiments.
Figure 2:
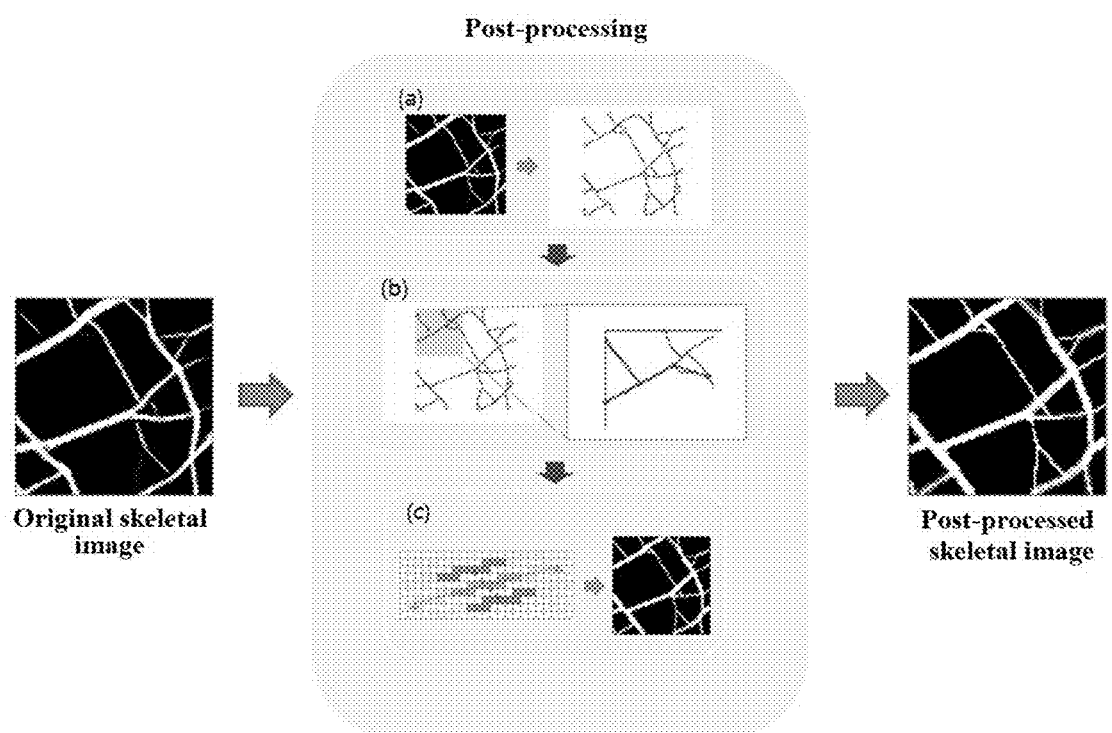
FIG. 2 is a diagram for conceptually describing an operating principle of the computer apparatus according to various embodiments.

FIG. 1 is a diagram illustrating an internal construction of a computer apparatus 100 according to various embodiments. FIG. 2 is a diagram for conceptually describing an operating principle of the computer apparatus 100 according to various embodiments.

Referring to FIG. 1, the computer apparatus 100 according to various embodiments may include at least one of an input module 110, an output module 120, a memory 130, or a processor 140. In an embodiment, at least one of the components of the computer apparatus 100 may be omitted, and at least one other component may be added to the computer apparatus 100. In an embodiment, at least two of the components of the computer apparatus 100 may be implemented as a single integrated circuit.

The input module 110 may receive a signal to be used for at least one component of the computer apparatus 100. The input module 110 may include at least one of an input device configured to enable a user to directly input a signal to the computer apparatus 100, a sensor device configured to generate a signal by sensing a surrounding change, or a reception device configured to receive a signal from an external device. For example, the input device may include at least one of a microphone, a mouse or a keyboard. In an embodiment, the input device may include at least one of touch circuitry configured to detect a touch or a sensor circuit configured to measure the intensity of a force generated by a touch.

The output module 120 may output information to the outside of the computer apparatus 100. The output module 120 may include at least one of a display device configured to visually output information, an audio output device capable of outputting information in the form of an audio signal, or a transmission device capable of wirelessly transmitting information. For example, the display device may include at least one of a display, a hologram device or a projector. For example, the display device may be assembled with at least one of the touch circuit or sensor circuit of the input module 110, and thus may be implemented as a touch screen. For example, the audio output module may include at least one of a speaker or a receiver.

According to an embodiment, the reception device and the transmission device may be implemented as a communication module. The communication module may perform communication with an external device in the computer apparatus 100. The communication module may establish a communication channel between the computer apparatus 100 and the external device, and may perform communication with the external device through the communication channel. In this case, the external device may include at least one of a vehicle, a satellite, a base station, a server or another computer system. The communication module may include at least one of a wired communication module or a wireless communication module. The wired communication module is connected to the external device in a wired way, and may communicate with the external device in a wired way. The wireless communication module may include at least one of a short-distance communication module or a long-distance communication module. The short-distance communication module may communicate with the external device using the short-distance communication method. For example, the short-distance communication method may include at least one of Bluetooth, WiFi direct, or infrared data association (IrDA). The long-distance communication module may communicate with the external device using the long-distance communication method. In this case, the long-distance communication module may communicate with the external device over a network. For example, the network may include at least one of a cellular network, the Internet, or a computer network, such as a local area network (LAN) or a wide area network (WAN).

The memory 130 may store various data used by at least one component of the computer apparatus 100. For example, the memory 130 may include at least one of a volatile memory or a nonvolatile memory. The data may include at least one program and input data or output data related thereto. The program may be stored in the memory 130 as software including at least one instruction, and may include at least one of an operating system, middleware, or an application.

The processor 140 may control at least one component of the computer apparatus 100 by executing a program of the memory 130. Accordingly, the processor 140 may perform data processing or an operation. In this case, the processor 140 may execute an instruction stored in the memory 130.

According to various embodiments, as illustrated in FIG. 2, the processor 140 may generate a post-processed skeletal image by applying a node-link graph-based bone microstructure post-processing technology to an original skeletal image. In this case, the original skeletal image may have been reconstructed from a low resolution skeletal image through an artificial neural network. Specifically, as illustrated in FIG. 2(*a*), the processor 140 may represent a node-link graph from a bone microstructure of the original skeletal image. In this case, the processor 140 may represent trabeculae of the bone microstructure as a plurality of links, and may represent points at which the links are connected and an open end of at least one of the links as a plurality of nodes. Furthermore, as illustrated in FIG. 2(*b*), the processor 140 may reinforce the connectivity of the bone microstructure in the node-link graph. In this case, the processor 140 may adjust the location of a node of an open end of the links, that is, an open node, as an adjacent element. In this case, the adjacent node may include at least one of a link, a node, or a boundary. Furthermore, as illustrated in FIG. 2(*c*), the processor 140 may change the node-link graph into a skeletal image.

Figure 3:
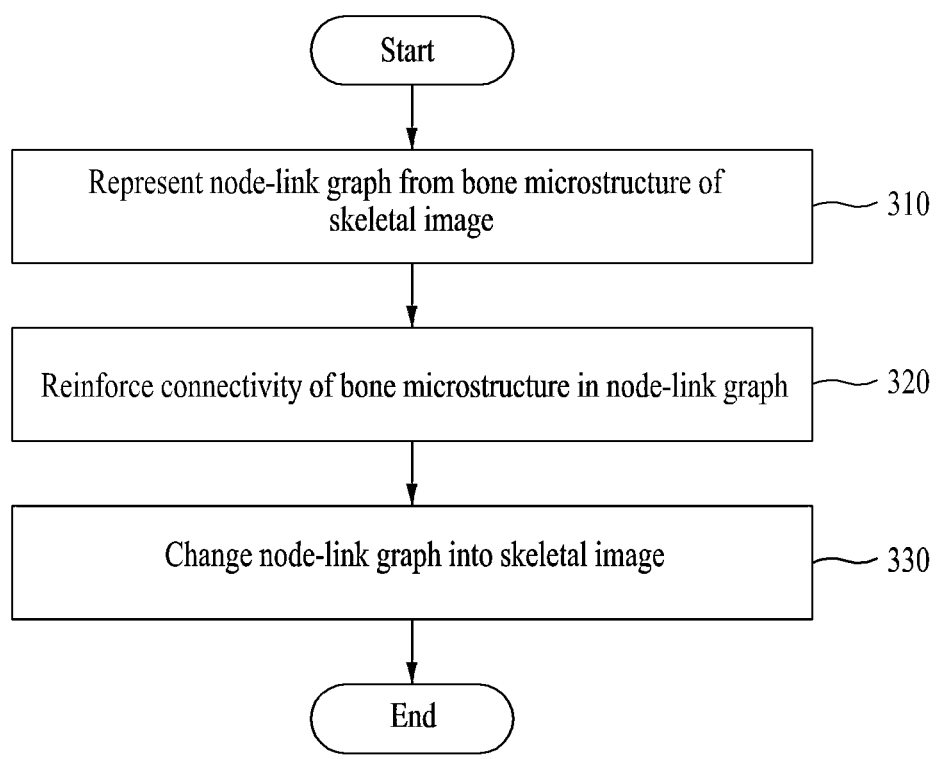
FIG. 3 is a diagram illustrating an operating method of the computer apparatus according to various embodiments.

FIG. 3 is a diagram illustrating an operating method of the computer apparatus 100 according to various embodiments. FIGS. 4, 5, 6, and 7 are diagrams for exemplarily describing an operating method of the computer apparatus 100 according to various embodiments.

Figure 4:
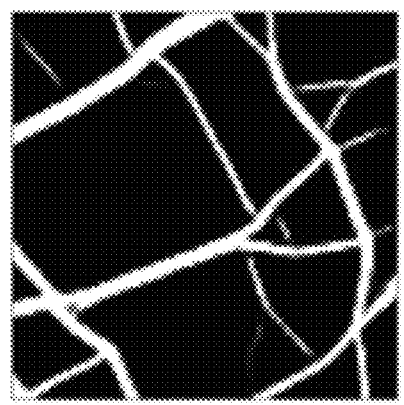
FIGS. 4, 5, 6, and 7 are diagrams for exemplarily describing an operating method of the computer apparatus according to various embodiments.
Figure 4:
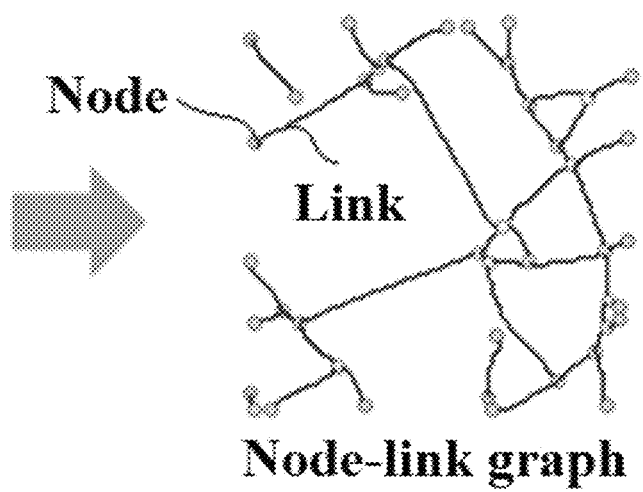

Referring to FIG. 3, in step 310, the computer apparatus 100 may represent a node-link graph from a bone microstructure of a skeletal image. In this case, the skeletal image may be denoted as an original skeletal image, and may have been reconstructed from a low resolution skeletal image through an artificial neural network. The skeletal image may be directly generated by the computer apparatus 100 or may be received from an external device. The node-link graph is a method of dividing a target into nodes and links and representing a connection between the nodes as the links. Specifically, the processor 140 may represent trabeculae of the bone microstructure as a plurality of links and then represent a plurality of nodes in the links. In this case, the processor 140 may represent points at which the links are connected and an open end of at least one of the links as nodes. Accordingly, as illustrated in FIG. 4, the processor 140 may generate a node-link graph corresponding to the skeletal image.

Figure 5:
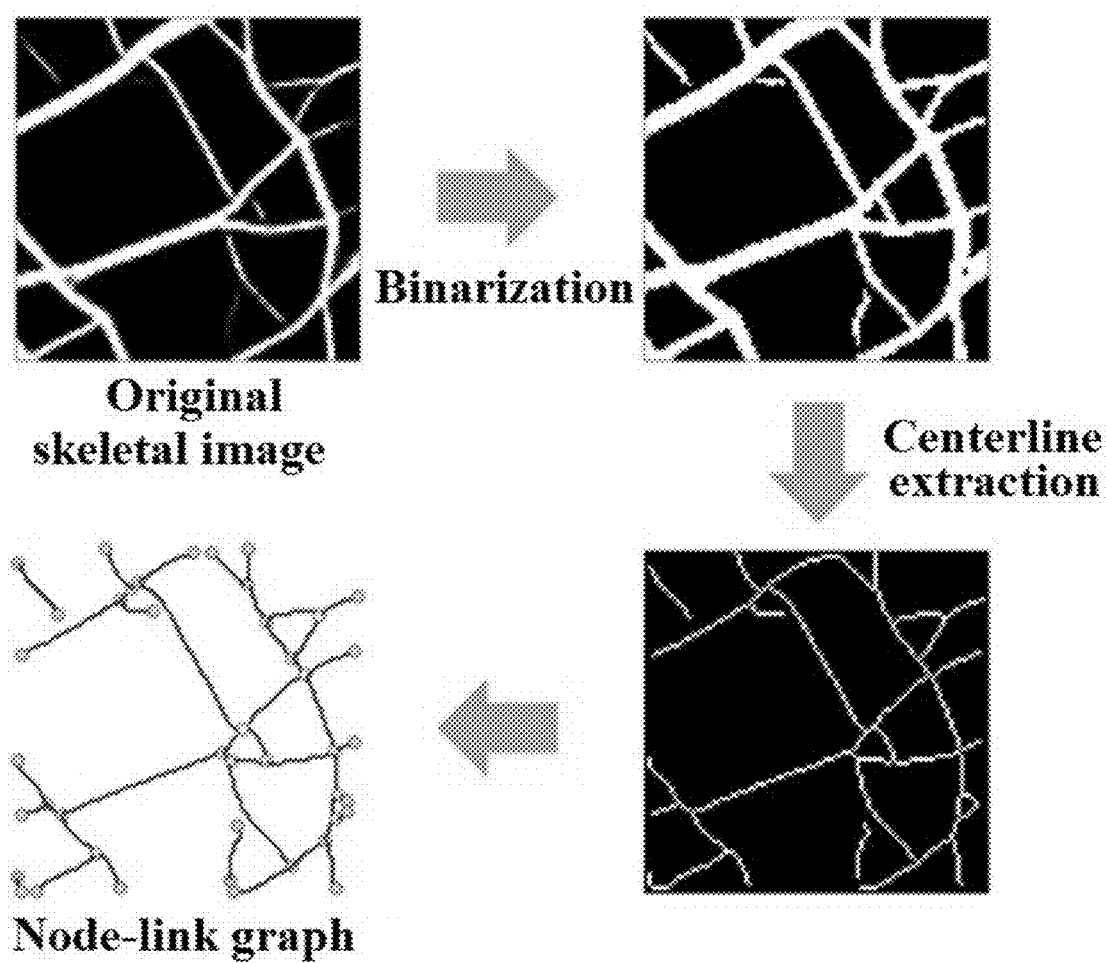

In some embodiments, the processor 140 may pre-process a skeletal image and then represent node-link graph from the pre-processed skeletal image. Specifically, as illustrated in FIG. 5, the processor 140 may obtain a binarization image by performing image binarization that preserves the connectivity of an input image with respect to a skeletal image. For example, image binarization that preserves the connectivity of an input image may be performed by setting a binarization threshold to 0.05 in a skeletal image in which a BMD distribution is represented as 0.01 to 1. Thereafter, as illustrated in FIG. 5, the processor 140 may obtain a centerline image by performing centerline extraction on a binarization image. Thereafter, the processor 140 may represent a node-link graph corresponding to the skeletal image based on the centerline image.

As a skeletal image is represented as a node-link graph as described above, the construction of data can be simplified compared to pixel (or voxel)-based image information, and various quantitative indices for the connectivity of a bone microstructure can be secured. The indices for the connectivity of the bone microstructure may include at least one of the number of nodes, the number of links, a node degree, or the number of unconnected nodes. In this case, the node degree means the number of links connected to a node. A node not disposed at a boundary (i.e., the boundary of a skeletal image or a node-link graph) among nodes having a node degree of 1 may be indicated as a node whose connection with surroundings is disconnected.

Next, in step 320, the computer apparatus 100 may reinforce the connectivity of the bone microstructure in the node-link graph. In this case, the structural discontinuity of the bone microstructure may have a negative effect on the accuracy of bone strength evaluation. For example, when an external load is applied, the propagation of loads is impossible in a portion of the bone microstructure where structural discontinuity occurs. Accordingly, the portion may indicate a bone strength value lower than an actual value. In order to solve such a problem, the occurrence of structural discontinuity needs to be suppressed in advance, or a portion where structural discontinuity occurs needs to be connected through post-processing. Accordingly, in order to effectively represent and improve the connectivity of the bone microstructure, the processor 140 may reinforce the connectivity of the bone microstructure in the node-link graph.

Figure 6:
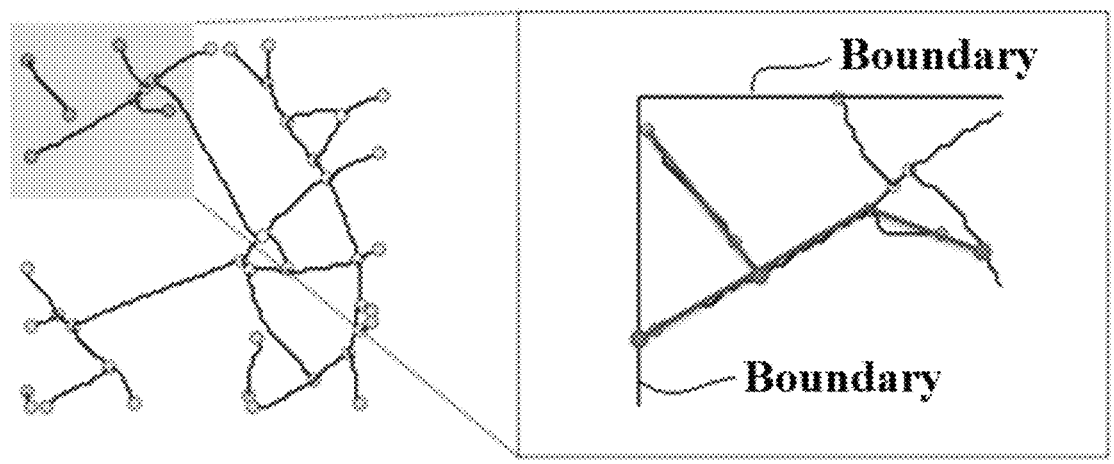
Figure 7:
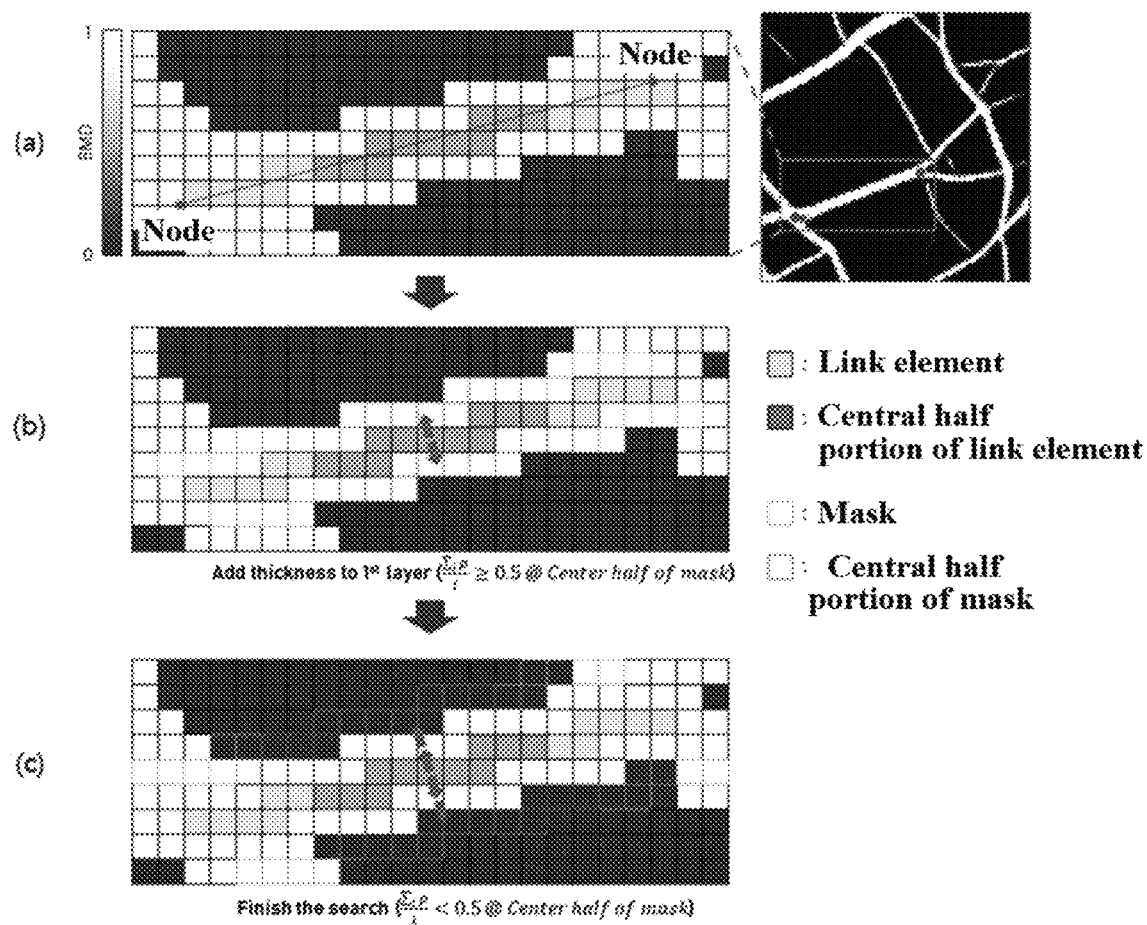

In this case, the processor 140 may reinforce the connectivity of the bone microstructure based on a node degree. In this case, the structural discontinuity of the bone microstructure occurs in a node having a node degree of 1. The node having a node degree of 1 may indicate an open node connected to only one link. Specifically, as illustrated in FIG. 6, the processor 140 may adjust a location of the open node as an adjacent element in the node-link graph. In this case, the adjacent element may include at least one of a link, a node, or a boundary. That is, the processor 140 may move the location of the open node on the adjacent element in the node-link graph. Accordingly, the discontinuity of the bone microstructure can be removed.

Next, in step 330, the computer apparatus 100 may change the node-link graph into a skeletal image. In this case, the processor 140 may represent trabeculae corresponding to respective links of the node-link graph. Furthermore, the processor 140 may represent the thickness of each of the trabeculae by using bone mineral density (BMD) of each of the links.

To this end, the processor 140 may search for the BMD of each of the links of the node-link graph. Specifically, as illustrated in FIG. 7(a), with respect to each link, the processor 140 may detect, as a link element, pixels belonging to a corresponding link in an original skeletal image. Thereafter, as illustrated in FIGS. 7(b) and (c), the processor 140 may search for the BMD of pixels adjacent to the link element. In this case, the processor 140 may search for the BMD of pixels in a direction perpendicular to a corresponding link by using a mask having the same shape as an arrangement of the link element. In this case, the processor 140 may use only a mask of a central half portion in order to prevent the influence of an adjacent trabecular bone. In other words, if pixels an adjacent the link element are present as a plurality of layers, the processor 140 may search for the BMD of pixels for each layer. For example, the processor 140 may search for the BMD of the first layer as illustrated in FIG. 7(b), and may then search for the BMD of the second layer as illustrated in FIG. 7(c). Accordingly, if the BMD of a central half portion of a current layer is greater than a predetermined value, for example, 0.5, the processor 140 may set the corresponding BMD in the entire current layer, and may search for the BMD of a central half portion of a next layer. If the BMD of a central half portion of a current layer is equal to or smaller than a predetermined value, for example, 0.5, the processor 140 may exclude the corresponding BMD without setting the corresponding BMD in the current layer, and may no longer search for the BMD of a next layer. Accordingly, the processor 140 may include a step of representing the thickness of each of trabeculae by using BMD while representing trabeculae corresponding to links, respectively.

If the aforementioned node-link graph-based bone microstructure post-processing technology is applied to a bone microstructure reconstructed through an artificial neural network, bone strength can be evaluated with high accuracy compared to the existing technology because the occurrence of a discontinuous structure is minimized and a structural characteristic of the existing bone microstructure can be incorporated. A procedure for verifying the evaluation of bone strength having high accuracy was performed. In this case, an artificial neural network was implemented as a U-Net. The U-Net is a full convolution neural network-based artificial neural network, and is widely used in the image processing field. The node-link graph-based bone microstructure post-processing technology was applied to a bone microstructure reconstructed through the U-Net. Pieces of strength before and after the application were compared. In this case, for quantitative verification, a connectivity index of a bone microstructure and an apparent elastic modulus, that is, a bone strength-related factor, were used. As a result of applying the node-link graph-based bone microstructure post-processing technology to multiple bone microstructure patches, the connectivity index of the bone microstructure was generally improved, and an error of the apparent elastic modulus was also greatly reduced.

A current BMD-based osteoporosis diagnosis method has problems in that it is inaccurate in the estimation of bone strength because a "bony tissue" is not incorporated and diagnosis results may be different depending on the selection of a BMD reference group. Skeletal image reconstructed methods research so far have limits in a calculation cost aspect (phase optimization design method), a high resolution capability (artificial neural network method), etc. For clinic application, a new technology development capable of overcoming such a limit is necessary. The technology according to various embodiments can provide accurate bone microstructure information necessary for osteoporosis diagnosis by solving an artificial structural discontinuity problem with an artificial neural network-based skeletal image high resolution technology.

Furthermore, various medications, such as bisphosphonate, tibolone, and denosumab, are used currently for osteoporosis treatment. In general, the effectiveness of medication is determined in an increment or decrement aspect of bone mass. However, in order to specify an accurate influence of an individual medication on a bone microstructure, it is necessary to obtain bone microstructure information within a living body. If a bone microstructure is accurately represented through the technology according to various embodiments, it is possible to more accurately specify an effect of an individual medication for a bone microstructure and also bone strength. This means that a side effect of an individual patient can be minimized through patient-customized prescription.

The technology according to various embodiments has the following advantages in a technological aspect. First, a physical limit of medical imaging equipment can be overcome through image post-processing. In current medical imaging equipment, resolution within a living body which may be obtained is limited to several hundred of a μm level due to limits, such as excessive radiation exposure and a long photographing time. However, the technology according to various embodiments can effectively represent a bone microstructure through an image post-processing method free of such physical limits, and can provide bone microstructure-related information, such as accurate bone strength required for the skeletal clinic field. Furthermore, the technology according to various embodiments is an image post-processing method not limited by the type of image photographing equipment, and can be easily applied to various types of the existing medical imaging equipment at a relatively low cost. Second, the reliability of early diagnosis of osteoporosis can be improved. Currently, osteoporosis is diagnosed through BMD-based relative evaluation. However, such a method has low diagnosis reliability because information on a bone microstructure is not incorporated and bone strength cannot be accurately evaluated. However, the technology according to various embodiments can accurately evaluate bone strength by providing bone microstructure information through the post-processing of a medical image. Furthermore, the technology according to various embodiments can greatly contribute the improvement of reliability of osteoporosis early diagnosis because a low-dose rate and low-resolution medical image is used and long-term tracking radiation is possible.

The technology according to various embodiments has the following advantages in economical and industrial aspects. That is, osteoporosis-related medical costs can be reduced.

Currently, medical costs attributable to osteoporosis fracture in the United States are $18 billion a year. Medical costs for osteoporosis treatment in Korea are also very high, that is, 807.2 billion Korean won. However, the technology according to various embodiments can pre-emptively and effectively handle osteoporosis and osteoporosis fracture because the technology can contribute to accurate diagnosis of osteoporosis. If osteoporosis can be reliably early diagnosed through the technology according to various embodiments, a reduction in medical costs according to the prevention of osteoporosis and a reduction in a side effect according to over-diagnosis and/or miss diagnosis may be expected.

The technology according to various embodiments has the following advantage in a social aspect. That is, quality of life of people can be improved through the improvement of accuracy of osteoporosis diagnosis, and national finance can be reinforced. Osteoporosis fracture causes not only direct costs for treatment, but enormous social expenses, such as additional labor power inputted for the treatment of patients and a loss of earnings attributable to the early death of patients. According to the results of research based on data of aging research panel search, it was found that if people aged 50 to 80 years old are attacked with one osteoporosis fracture, pension spending of an average of 70 million Korean won is increased compared to a case where fracture does not occur, whereas direct and indirect taxes are reduced by an average of 53 million Korean won. However, the technology according to various embodiments can contribute to reliable early diagnosis and timely medical mediation related to osteoporosis, and can prevent the occurrence of enormous social expenses attributable to osteoporosis fracture.

Accordingly, the technology according to various embodiments can be industrialized as various technology fields. First, the technology according to various embodiments may be used to construct a rapid and quantitative clinic diagnosis system based on a medical skeletal image. The existing medical imaging equipment can obtain only a medical image having limited resolution due to limited radiation exposure and photographing time. Various technologies are developed in order to solve such problems, but equipment (or technology) capable of photographing a bone microstructure within a living body has not yet been reported. However, the technology according to various embodiments may reform the existing skeletal disease diagnosis system because the technology does not generate an enormous expense attributable to the replacement of hardware and can provide bone microstructure information within a short time. Second, the technology according to various embodiments may be used in medication development for skeletal disease treatment. In the technology according to various embodiments, the post-processing of a bone microstructure is performed on a low resolution image having small radiation exposure. Accordingly, an excessive radiation exposure problem according to long-term tracking radiation can be solved, and a change in a bone microstructure can be analyzed. Accordingly, an effect that medication for skeletal disease treatment affects a bone microstructure can be specified.

Various embodiments provide the computer apparatus 100 for the bone microstructure connectivity recovery of a skeletal image reconstructed through an artificial neural network using the representations of a node-link graph-based bone microstructure and a method thereof.

A method of the computer apparatus 100 according to various embodiments may include a step (step 310) of representing a node-link graph from a bone microstructure of an input skeletal image, a step (step 320) of reinforcing the connectivity of the bone microstructure in the node-link graph, and a step (step 330) of changing the node-link graph into a skeletal image.

According to various embodiments, the step (step 310) of representing the node-link graph may include steps of representing trabeculae of the bone microstructure as a plurality of links, and representing, as a plurality of nodes, points at which the links are connected and an open end of at least one of the links.

According to various embodiments, the step (step 310) of representing the node-link graph may further include steps of obtaining a binarization image by performing image binarization on the inputted skeletal image, and obtaining a centerline image by performing centerline extraction in the binarization image. In such a case, the links may be represented based on the centerline image.

According to various embodiments, the computer apparatus 100 may reconstruct the skeletal image from the inputted skeletal image reconstructed through an artificial neural network.

According to various embodiments, the step (step 320) of reinforcing the connectivity of the bone microstructure may include a step of adjusting, as an adjacent element, a location of an open node in the node-link graph.

According to various embodiments, the open node may be a node having a node degree of 1.

According to various embodiments, the adjacent element may include at least one of a link, a node, or a boundary.

According to various embodiments, the step (step 330) of changing the node-link graph into the skeletal image may include steps of searching for bone mineral density (BMD) of each of the plurality of links of the node-link graph, and representing the thickness of each of trabeculae by using the BMD while representing the trabeculae corresponding to the links, respectively.

According to various embodiments, the step of searching for the BMD may include searching for BMD of a central portion of a mask while moving, in a direction perpendicular to each link, the mask having the same shape as a link element composed of pixels belonging to the link in the inputted skeletal image.

According to various embodiments, the step of searching for the BMD may include steps of, if pixels adjacent to the link element are present as a plurality of layers, searching for BMD of a current layer, searching for BMD of a next layer while setting the BMD of the current layer when the BMD of the current layer is greater than a predetermined value, and excluding the BMD of the current layer when the BMD of the current layer is equal to or smaller than the predetermined value.

The computer apparatus 100 according to various embodiments may include the memory 130, and the processor 140 connected to the memory 130 and configured to execute at least one instruction stored in the memory 130.

According to various embodiments, the processor 140 may be configured to represent a node-link graph from a bone microstructure of an input skeletal image, reinforce a connectivity of the bone microstructure in the node-link graph, and change the node-link graph into a skeletal image.

According to various embodiments, the processor 140 may be configured to represent trabeculae of the bone microstructure as a plurality of links, and represent, as a plurality of nodes, points at which the links are connected and an open end of at least one of the links.

According to various embodiments, the processor 140 may be configured to obtain a binarization image by performing image binarization on the inputted skeletal image, obtain a centerline image by performing centerline extraction in the binarization image, and represent the links and the nodes based on the centerline image.

According to various embodiments, the processor 140 may be configured to reconstruct the skeletal image from the inputted skeletal image reconstructed through an artificial neural network.

According to various embodiments, the processor 140 may be configured to adjust, as an adjacent element, a location of an open node in the node-link graph.

According to various embodiments, the adjacent element may include at least one of a link, a node, or a boundary.

According to various embodiments, the processor 140 may be configured to search for bone mineral density (BMD) of each of the plurality of links of the node-link graph, and represent a thickness of each of trabeculae by using the BMD while representing the trabeculae corresponding to the links, respectively.

According to various embodiments, the processor 140 may be configured to search for BMD of a central portion of a mask, while moving, in a direction perpendicular to each link, the mask having a shape identical with a shape of a link element composed of pixels belonging to the link in the inputted skeletal image.

According to various embodiments, the processor 140 may be configured to if pixels adjacent to the link element are present as a plurality of layers, search for BMD of a current layer, search for BMD of a next layer while setting the BMD of the current layer when the BMD of the current layer is greater than a predetermined value, and exclude the BMD of the current layer when the BMD of the current layer is equal to or smaller than the predetermined value.

The aforementioned method may be provided as a computer program stored in a computer-readable recording medium in order to be executed in a computer. The medium may continue to store a program executable by a computer or may temporarily store the program for execution or download. Furthermore, the medium may be various recording means or storage means having a form in which one or a plurality of pieces of hardware has been combined. The medium is not limited to a medium directly connected to a computer system, but may be one distributed over a network. Examples of the medium may be magnetic media such as a hard disk, a floppy disk and a magnetic tape, optical media such as a CD-ROM and a DVD, magneto-optical media such as a floptical disk, and media configured to store program instructions, including, a ROM, a RAM, and a flash memory. Furthermore, other examples of the medium may include recording media and/or storage media managed in an app store in which apps are distributed, a site in which various other pieces of software are supplied or distributed, a server, etc.

The methods, operations or schemes of this disclosure may be implemented by various means. For example, such schemes may be implemented as hardware, firmware, software, or a combination of them. Those skilled in the art will understand that various exemplary logical blocks, modules, circuits, and algorithm steps described in association with the present disclosure may be implemented as electronic hardware, computer software, or combinations of them. In order to clearly describe such a mutual substitution of hardware and software, various exemplary components, blocks, modules, circuits, and steps have been generally described above from their functional viewpoints. Whether such a function is implemented as hardware or implemented as software is different depending on design requirements assigned to a specific application and the entire system. Those skilled in the art may implement a function described in various manners for each specific application, but such implementations should not be construed as departing from the scope of this disclosure.

In a hardware implementation, processing units used to perform schemes may be implemented within one or more ASICs, DSPs, digital signal processing devices (DSPDs), programmable logic devices (PLDs), field programmable gate arrays (FPGAs), processors, controllers, microcontrollers, micro processors, electronic devices, other electronic units designed to perform functions described in this disclosure, a computer, or a combination of them.

Accordingly, various exemplary logical blocks, modules, and circuits described in association with this disclosure may be implemented or performed as a general-purpose processor, a DSP, an ASIC, an FPGA or another programmable logical device, a discrete gate or transistor logic, discrete hardware components or a given combination of them designed to perform functions described in the present disclosure. The general-purpose processor may be a microprocessor, but alternatively, the processor may be a given conventional processor, controller, microcontroller, or state machine. Furthermore, the processor may be implemented as a combination of computing devices, for example, a DSP and a microprocessor, a plurality of microprocessors, one or more microprocessors associated with a DSP core, or a combination of given other components.

In firmware and/or software implementation, schemes may be implemented as instructions stored in a computer-readable medium, such as a random access memory (RAM), a read-only memory (ROM), a non-volatile random access memory (NVRAM), a programmable read-only memory (PROM), an erasable programmable read-only memory (EPROM), an electrically erasable PROM (EEPROM), a flash memory, a compact disc (CD), a magnetic or optical data storage device. The instructions may be executed by one or more processors and may enable a processor(s) to perform specific aspects of a function described in this disclosure.

The aforementioned embodiments have been described as using aspects of the subject matter now disclosed in one or more independent computer systems, but this disclosure is not limited thereto and may be implemented in association with a network or a given computing environment, such as a distributed computing environment. Furthermore, in this disclosure, aspects of the subject matter may be implemented in a plurality of processing chips or devices, and storage may be similarly influenced in a plurality of devices. Such devices may include PCs, network servers, and portable devices.

Although this disclosure has been described in relation to some embodiments, the disclosure may be modified and changed in various ways without departing from the scope of this disclosure which may be understood by those skilled in the art to which an invention of this disclosure belongs. Furthermore, such a modification and change should be considered as belonging to the scope of the claims appended in the specification.

The embodiments of the disclosure in which an exclusive property or privilege is claimed are defined as follows:

1. A method of a computer apparatus, comprising:
representing a node-link graph from a bone microstructure of an input skeletal image;
reinforcing a connectivity of the bone microstructure in the node-link graph; and
changing the node-link graph into a skeletal image, wherein the changing of the node-link graph into the skeletal image comprises:
searching for bone mineral density (BMD) of each of the plurality of links of the node-link graph; and
representing a thickness of each of trabeculae by using the BMD while representing the trabeculae corresponding to the links, respectively, and
wherein the searching for the BMD comprises searching for BMD of a central portion of a mask, while moving, in a direction perpendicular to each link, the mask having a shape identical with a shape of a link element composed of pixels belonging to the link in the inputted skeletal image.

2. The method of claim 1, wherein the representing of the node-link graph comprises:
representing trabeculae of the bone microstructure as a plurality of links; and
representing, as a plurality of nodes, points at which the links are connected and an open end of at least one of the links.

3. The method of claim 2, wherein the representing of the node-link graph further comprises:
obtaining a binarization image by performing image binarization on the inputted skeletal image; and
obtaining a centerline image by performing centerline extraction in the binarization image,
wherein the links are represented based on the centerline image.

4. The method of claim 1, wherein the computer apparatus reconstructs the skeletal image from the inputted skeletal image reconstructed through an artificial neural network.

5. The method of claim 1, wherein the reinforcing of the connectivity of the bone microstructure comprises moving a location of an open node to a location of an adjacent element in the node-link graph, and the adjacent element is an adjacent link in the node-link graph, an adjacent node in the node-link graph, or a boundary of the node-link graph.

6. The method of claim 5, wherein the open node is a node having a node degree of 1.

7. The method of claim 1, wherein the searching for the BMD comprises:
if pixels adjacent to the link element are present as a plurality of layers,
searching for BMD of a current layer;
searching for BMD of a next layer while setting the BMD of the current layer when the BMD of the current layer is greater than a predetermined value; and
excluding the BMD of the current layer when the BMD of the current layer is equal to or smaller than the predetermined value.

8. A computer apparatus comprising:
a memory; and
a processor connected to the memory and configured to execute at least one instruction stored in the memory,
wherein the processor is configured to:
represent a node-link graph from a bone microstructure of an input skeletal image,
reinforce a connectivity of the bone microstructure in the node-link graph, and
change the node-link graph into a skeletal image,
wherein the processor is configured to:
search for bone mineral density (BMD) of each of the plurality of links of the node-link graph, and
represent a thickness of each of trabeculae by using the BMD while representing the trabeculae corresponding to the links, respectively, and
wherein the processor is configured to search for BMD of a central portion of a mask, while moving, in a direction perpendicular to each link, the mask having a shape identical with a shape of a link element composed of pixels belonging to the link in the inputted skeletal image.

9. The computing apparatus of claim 8, wherein the processor is configured to:
represent trabeculae of the bone microstructure as a plurality of links, and
represent, as a plurality of nodes, points at which the links are connected and an open end of at least one of the links.

10. The computing apparatus of claim 9, wherein the processor is configured to:
obtain a binarization image by performing image binarization on the inputted skeletal image,
obtain a centerline image by performing centerline extraction in the binarization image, and
represent the links and the nodes based on the centerline image.

11. The computing apparatus of claim 8, wherein the processor is configured to reconstruct the skeletal image from the inputted skeletal image reconstructed through an artificial neural network.

12. The computing apparatus of claim 8, wherein the processor is configured to move a location of an open node to a location of an adjacent element in the node-link graph, and the adjacent element is an adjacent link in the node-link graph, an adjacent node in the node-link graph, or a boundary of the node-link graph.

13. The computing apparatus of claim 8, wherein the processor is configured to:
if pixels adjacent to the link element are present as a plurality of layers,
search for BMD of a current layer,
search for BMD of a next layer while setting the BMD of the current layer when the BMD of the current layer is greater than a predetermined value, and
exclude the BMD of the current layer when the BMD of the current layer is equal to or smaller than the predetermined value.

14. A non-transitory computer-readable recording medium on which one or more programs for executing a method in a computer apparatus are recorded, the method comprising:
representing a node-link graph from a bone microstructure of an input skeletal image;
reinforcing a connectivity of the bone microstructure in the node-link graph; and
changing the node-link graph into a skeletal image,
wherein the changing of the node-link graph into the skeletal image comprises:
searching for bone mineral density (BMD) of each of the plurality of links of the node-link graph; and
representing a thickness of each of trabeculae by using the BMD while representing the trabeculae corresponding to the links, respectively, and
wherein the searching for the BMD comprises searching for BMD of a central portion of a mask, while moving, in a direction perpendicular to each link, the mask having a shape identical with a shape of a link element composed of pixels belonging to the link in the inputted skeletal image.

* * * * *